United States Patent [19]

Hosoya

[11] Patent Number: 4,920,703
[45] Date of Patent: May 1, 1990

[54] METHOD AND APPARATUS FOR FINISHING A TOOTH SURFACE OF A GEAR

[75] Inventor: Norio Hosoya, Kokubunji, Japan

[73] Assignee: Koganei Seiki Seisakusho, Tokyo, Japan

[21] Appl. No.: 230,546

[22] Filed: Aug. 10, 1988

[30] Foreign Application Priority Data

Aug. 10, 1987 [JP] Japan .................................. 62-198291
Jan. 28, 1988 [JP] Japan .................................... 63-17963

[51] Int. Cl.⁵ ............................................. B24B 1/00
[52] U.S. Cl. ...................................... 51/287; 51/52 R;
   51/56 G; 51/105 GG; 51/33 W; 51/DIG. 1
[58] Field of Search ............. 51/52 R, 56 G, 105 GG,
   51/123 G, 287, 26, DIG. 1, 33 R, 33 W

[56] References Cited

U.S. PATENT DOCUMENTS 1,948,071  2/1934  Hofmann ........................... 51/33 W
2,311,037  2/1943  Drummond .................... 51/DIG. 1
3,740,904  6/1973  Ainoura ............................... 51/287
4,339,895  7/1982  Fivian ................................. 51/33 R Primary Examiner—D. S. Meislin
Assistant Examiner—Jack Lavinder
Attorney, Agent, or Firm—Armstrong, Nikaido, Marmelstein, Kubovcik & Murray

[57] ABSTRACT

A workpiece and master gears are engaged each other and at least one of the workpiece and master gears is relatively rocked in a manner such that the relative rock movement of the master gear does not interfere substantially beyond an involute line of the gear tooth surface of the workpiece gear.

23 Claims, 7 Drawing Sheets

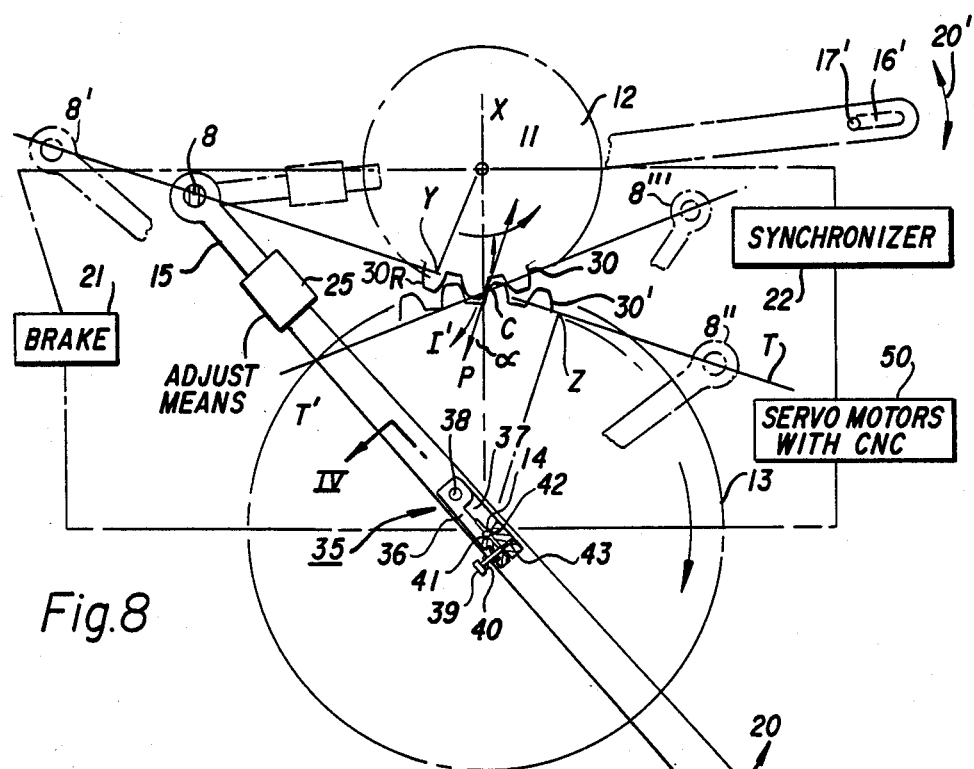
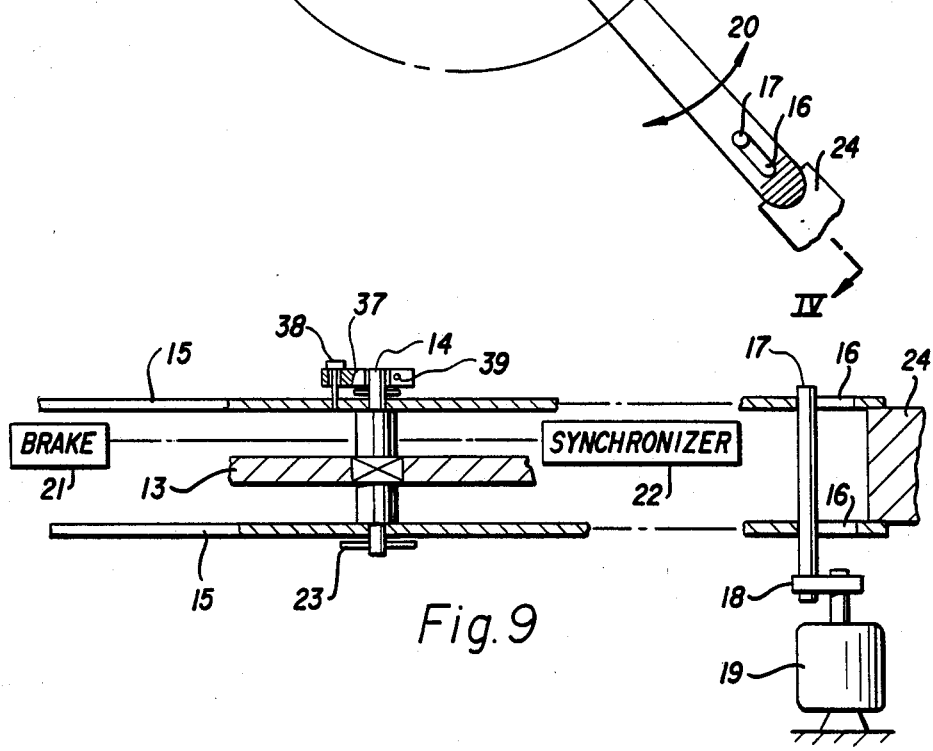
Fig. 8
Fig. 9

METHOD AND APPARATUS FOR FINISHING A TOOTH SURFACE OF A GEAR

BACKGROUND OF THE INVENTION

1. Field of the Invention

The present invention relates to a method and an apparatus for finishing the surface of a gear tooth which has a significantly reduced level of noise and heat generation during its operation.

2. Description of the Prior Art

Machine tools and automobiles incorporate large numbers of gears. These gears are formed by a gear cutting process using a gear hobbing machine or a gear shaper and by a subsequent tooth surface finishing process with a gear grinding machine which uses a gear shaving tool or a grinder.

In such a known tooth surface finishing method or apparatus, the accuracy of the finished shape of tooth surface largely depends on the accuracy of the shape of the shaving tool or grinder, the quality of the tools of the various machines used and the accuracy by which their rotations are synchronized. The finishing of a tooth surface performed by a gear grinding machine suffers from problems such as irregularities, or tool marks, formed at intervals on the tooth surface corresponding to a fixed feed pitch, and the shapes of the parts provided near the tooth are limited by the necessity of providing a relief for the grinder.

FIG. 1 is side view of a part of a workpiece gear 1. FIG. 2 is a cross-sectional view taken along the line II—II in FIG. 1. In finishing the tooth surfaces 30 of the gear 1, a finishing tool, for example, a grinding tool, is moved in a tooth trace direction, a direction substantially perpendicular with respect to the drawing sheet in FIG. 1. In other words, the tooth trace direction shown by the arrow 6 in FIG. 2 is used for grinding to finish the tooth surfaces 30.

According to such a finishing method, unevenness of the surface of the tooth surface 30 caused by a pitch error and a tooth profile error can be corrected with accuracy in the order of microns. However, since the grinding tool is moved in the tooth trace direction 6 in FIG. 2 in this finishing method, lateral unevenness of the surface of the grinding tool still remains on the tooth surface 30 as shown by e,v in FIG. 3. Although this surface unevenness remaining on the tooth surface 30 can be decreased by leveling the surface of the grinding tool, the grain gaps on the surface of the grinding tool will be clogged shortly into a state such that the shape of the gear 1 cannot be accurately corrected. Therefore, it is difficult to finish each of the tooth surfaces 30 of the gear 1 into a configuration of a smooth continuous single curve or line.

Further, since the grinding tool has generally slight dropouts itself and since the unevenness generated on one of the tooth surfaces 30 of the gear 1 differs from that generated on the other, it is extremely difficult to finish each individual tooth surface 30 exactly identical. Therefore, it is the present state of the art that the tooth surface 30 of each tooth of gear 1 are finished into different shapes. In other word, the tooth surfaces 30 are not satisfactory with respect to their relative surface roughness along the tooth surface curves, for example, involute curves, and have great non-uniformity in their final shapes.

FIG. 4 shows another prior art method of fishing a workpiece gear 1 by engagement with a master gear 2. In this method, it is also known to rock or vibrate the master gear 2 along a line X intersecting both center axes of the workpiece and master gears 1, 2. By this method, it is possible to slightly improve the finishing grade of the gear surface 30.

However, there are still difficulties with the above method, for example, the actual contact point C of the meshing gear surfaces of the gears 1 and 2 provides a contact with a specific angle $\alpha$. This angle $\alpha$ is called a pressure angle. Therefore, if gears 1 and 2 are vibrated along the center axis X, gear surface 30' of master gear 2 knocks into, does not slide over, the gear surface 30 of the workpiece gear 1 so that the resulting rocking motion causes an unnecessary unevenness on the gear surface 30. As a result, the gear surface 30 is not finished with an ideal involute curve.

BRIEF SUMMARY OF THE INVENTION

In order to avoid the above problem, contact point C should not interfere under the involute line of the workpiece gear and preferably slide along the involute line of the workpiece gear surface or along the pressure line.

Thus, it is an object of the present invention to provide a method and apparatus for finishing the gear tooth surface in which the workpiece and master gears are relatively rocked or vibrated such that the gear tooth surface 30' of the master gear does not interfer under the involute line of the gear tooth surface 30 of the workpiece gear and preferably slides over the latter.

BRIEF DESCRIPTION OF THE DRAWINGS

FIG. 8 is a schematic drawing of a first embodiment of the present invention;

FIG. 9 is a cross-sectional view taken along the line IV—IV of FIG. 8;

DETAILED DESCRIPTION OF THE PREFERRED EMBODIMENTS

Figure 5:
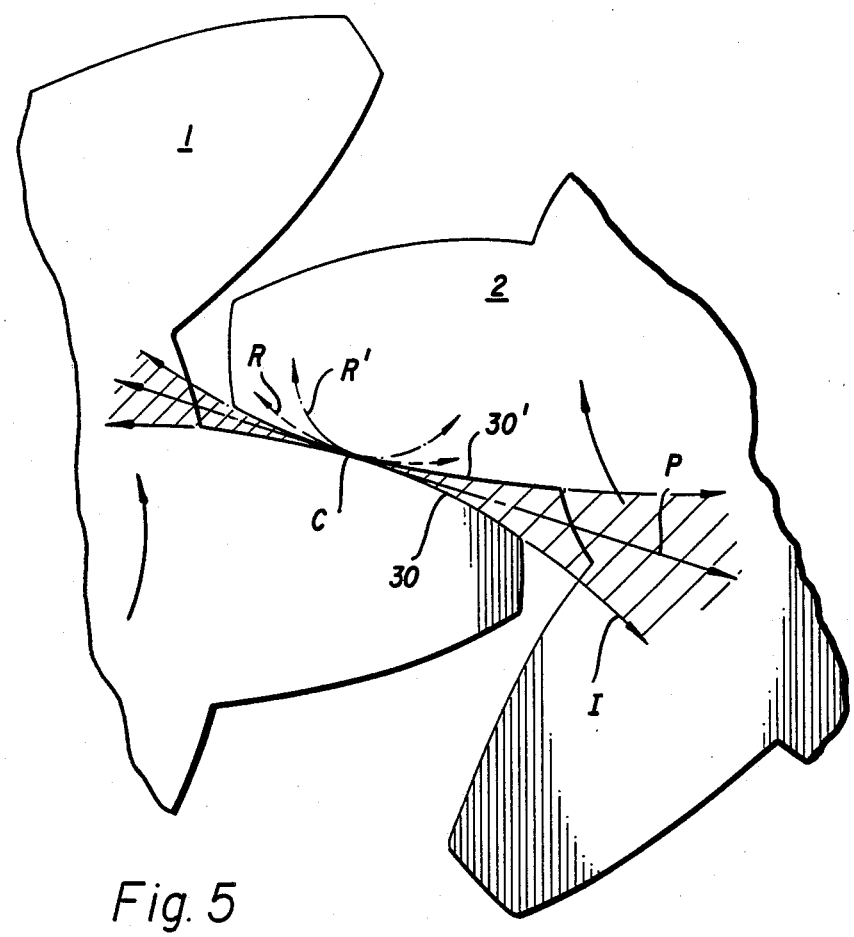
FIG. 5 is a plan view illustrating an operating principle of the present invention.

FIG. 5 shows a basic concept of the present invention. The gear tooth surface 30 ideally has a curved surface called an involute line. From this drawing, it is apparent that if the workpiece and master gears 1 and 2 are rocked with respect to each other such that the contact point C is rocked exactly along the involute line I. It is also apparent that the workpiece gear 1 and master gear 2 can be rocked along any direction such as the pressure line P or, if the rocking motion of master gear 2 along is considered, even in a direction R or R', so long as the gear tooth surface 30' does not interfere beyond the involute line I of the gear tooth surface 30 of the workpiece gear 1, in others words so that the gear tooth surface 30' does not interfere beyond the involute line into the body of the gear tooth being finished. Both curves R and R' are the circles each passing the contact point C and having tangent line P therethrough.

Thus, various rocking motions can be made, such as along the involute line I of workpiece gear 1 or I' of master gear 2, or along the pressure line p, or along any curve in the hatched area between the P two involute line I and I' or, if the rocking motion of master gear 2 alone is considered, even along the curve R or R' since, at the contact point C, both R and R' coincide with one another. In other words, at contact point C, P is a tangent line for all the curves R, R', I and I'.

Figure 6:
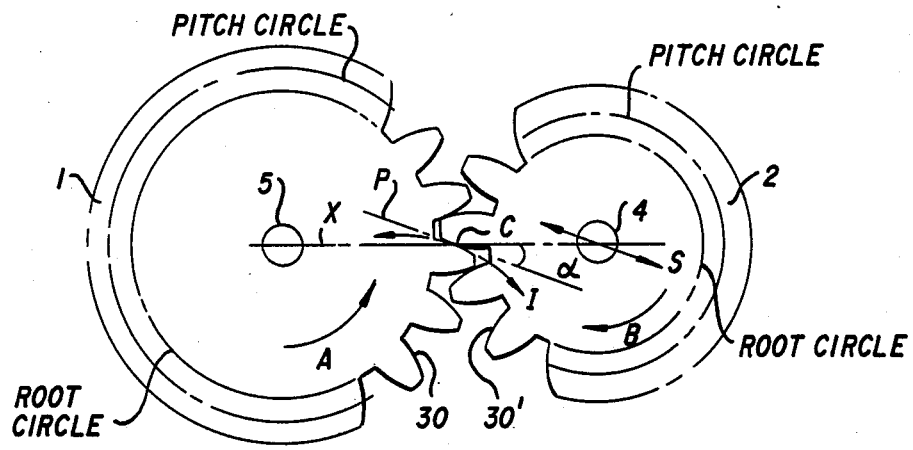
FIG. 6 is a plan view also illustrating an operational principle of the present invention.

FIG. 6 illustrates an operational principle of the present invention. Referring to FIG. 6, a workpiece gear 1 and a finishing master gear 2 are meshed with each other at sliding contacting point C. The master gear 2 is rotated in the direction indicated by the arrow B by the rotation of the workpiece gear 1. A braking force is applied to a rotary shaft 4 of the master gear 2 in a manner such that a suitable surface load acts upon contact point C. Diamond grains may be electrodeposited onto the tooth surface of the master gear 2 so as to provide the master gear 2 with a better finishing ability. The tooth surface of the workpiece gear 1 is finished basically by the sliding contact with the master gear.

An angle α is formed between a line X between rotary shaft 5 of the workpiece gear 1 and rotary shaft 4 of the master gear 2 and a tangential line P denotes a meshing pressure angle. The rotary shaft 4 of the master gear 2 is rocked back and forth in the direction indicated by the arrow S which is parallel to the pressure line P. The rocking movement of the master gear 2 may not be straight and can be in any direction within an area between line P and line I as explained above. The movement of the master gear could also be along curve R, as shown in FIG. 5.

Figure 7:
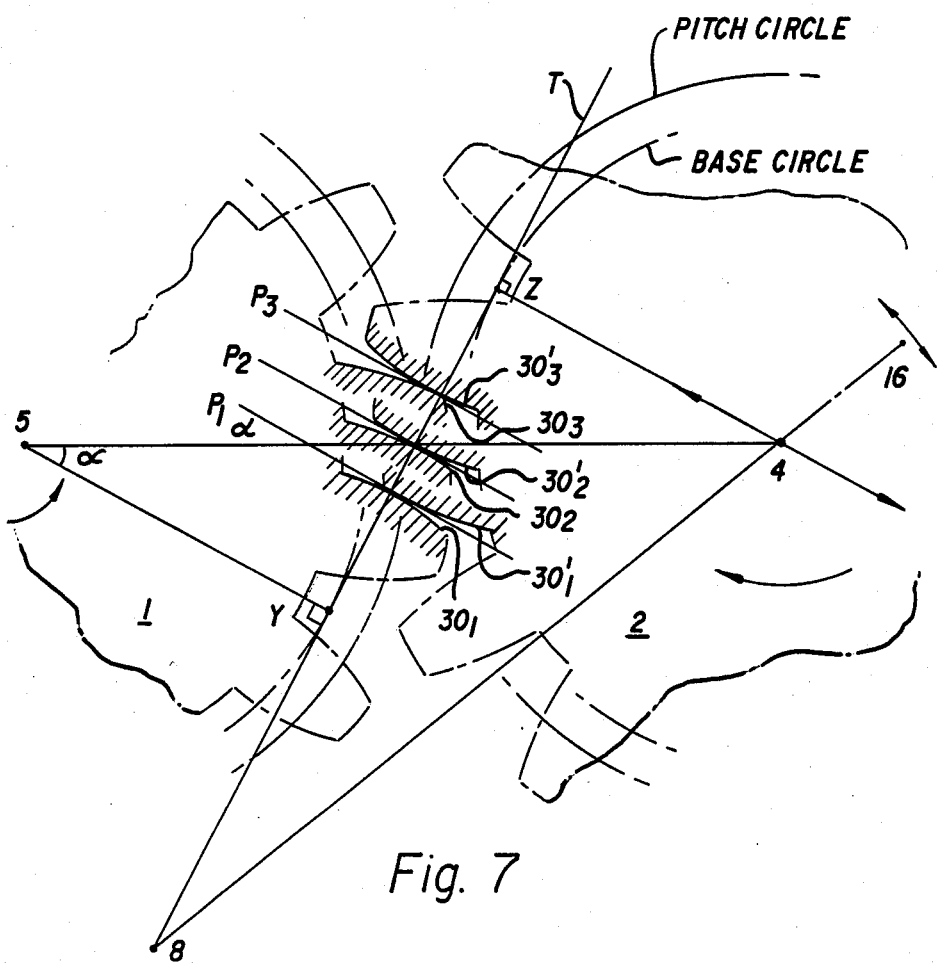
FIG. 7 is a plan view illustrating in more detail of an operational principle of the present invention.

FIG. 7 illustrates more detail of an operational principle of how to rock the master and/or workpiece gears. When the gear surface 30 of workpiece gear 1 rotates counterclockwise, the gear surface 30' of master gear 2 is rotated clockwise. As the gear surface 30 of the workpiece gear 1 is moved from $30_1$, to $30_2$ and to $30_3$, the gear surface 30' of the master gear 2 also moves from $30'_1$ to $30'_2$ and to $30'_3$. The pressure lines $P_1$, $P_2$ and $P_3$ between these surfaces remain parallel. The contact point C between the gear surfaces 30 and 30' shifts along the gear surfaces and also travels along a tangent line T drawn tangent to the base circles of gears 1 and 2. Thus if both gears 1 and 2 are relatively rocked along the pressure line between these gears, the contact point C between the gear surfaces 30 and 30' always rocks along the pressure lines $P_1$, $P_2$ and $P_3$ regardless of its position.

Point Y is the interference point or the center point of the curve of involute line I of gear surface 30 of workpiece 1. Thus if workpiece gear 1 and/or master gear 2 are rocked around interference point Y, the contact point C always rocks along the involute line of the gear surface 30 of the workpiece gear 1. If either gear 1 or 2 is rocked around a point on the tangent line T but spaced away from interference point Y with respect to the gear tooth engaging points, the contact pint C is rocked within an are below the pressure line P of the hatched area shown in FIG. 5. The further the rocking or pivot point is spaced away from the interference point Y, the more the rocking motion approaches the pressure line P. FIG. 7 illustrates master gear 2 is rocked at a point 16 around a point 8. However, it is also clear that so long as the gears are relatively rocked around any point on the tangent line T, the relative rock movement at the contact point C is always tangent with respects to the gear surface at contact point C.

An apparatus for finishing the tooth surfaces of a workpiece gear according to the present invention will be described below with reference to FIGS. 8–15.

In FIG. 8, a workpiece gear 12 is fixedly mounted on a drive shaft 11 driven by a prime mover (not shown) such as a drive motor or an engine. A master gear 13 designed for engagement with the workpiece gear 12 is fixedly mounted on a rotatable mounting shaft 14.

A pivot shaft 8 is provided at a suitable position on a tangential line T spaced from the master gear 13. The position of the pivot shaft 8 is adjustable by any conventional means. A pair of vertically spaced rocking levers 15 are supported at the pivot shaft 8 and positioned one on each side of master gear 13 so as to be rockable about the pivot shaft 8. The mounting shaft 14 is supported by the pair of the rocking levers 15. An adjuster 25 is provided to adjust the length of each lever 15. An elongated slot 16 is provided at a distant end of each of rocking lever 15, with respect to pivot shaft 8.

An elongated pin 17 is loosely fitted into slots 16, 16. Pin 17 is connected to a drive motor 19 through a crank arm 18.

Thus, drive motor 19, when driven, causes a rotating movement of pin 17 through the crank arm 18 and the pin 17 thus causes a rocking movement of rocking levers 15, 15 in a direction of the arrow 20 about the pivot shaft 8. The rocking of levers 15 generates a rocking movement of the master gear 13. It should be noted that the longer the distance between pivot 8 and the pin 17, the closer the rock movement of gear 13 approaches straight pressure line P.

The swing movement of the contact point C is shown by an arc I'. If the pivot 8 is located at the interference point Y of the workpiece gear 12, I' is always identical to the involute line I of the gear surface 30 of the workpiece gear 12.

Thus, if the rocking movement of workpiece gear 12 alone is considered, the position of pivot 8 can be even within interference point Y. On the other hand, the position of pivot 8 for the master gear 13 must be on interference point Y or at a position further away therefrom.

If, however, the pivot 8 is positioned at a point 8", or positioned on the right side of tangential line T from line X (as shown in FIG. 8) and if the workpiece 12 alone is rocked, the position of pivot 8" must be on the interference point Z of the master gear 13 or at a position further away therefrom. However, if the master gear 13 alone is rocked, the position of pivot 8" can be even between contact point C and interference points Z.

A braking member 35 is arranged to provide braking contact with the master gear 13. The contact pressure of the braking member 35 with respect to the master gear 13 may be selected such that when the master gear 13 rotates while in meshing engagement with the workpiece gear 12, suitable braking force is applied therebetween.

When the workpiece gear 12 is to be finished, the master gear 13 is preferably rocked by an amount which is selected to be from about 1/10 to 1/50 of the module of the master gear 13. The Module is defined as follows.

$$\text{Module} = \frac{\text{Diameter of Pitch Circle (mm)}}{\text{Number of Gear Teeth}}$$

The required number of times of rocking movement of the standard gear 13 for finishing the workpiece gear 12 is preferably selected to be from about 200 to 300 times as large as the number of revolutions of the workpiece gear 12. Further, the meshing engagement between the master gear 13 and the workpiece gear 12 is preferably selected such that, at the end of the rocking movement of the master gear 13 toward the workpiece gear 12, the master gear 13 is preferably in a state of deepest possible meshing engagement with the workpiece gear 12 relative to a state of normal meshing engagement therebetween.

It is readily understandable that the positions and angles of the workpiece and master gears should be adjusted in accordance with the type of the gears, such as a bevel gear, helical gear or the like in a manner such that the gear tooth surface of the master gear does not interfere beyond the involute line of the workpiece gear.

Further, the master gear 13 may have a modifying tooth profile besides a theoretically accurate tooth profile and may also be a gear having a shape other than the cylindrical shape, such as a rack or an oval gear. Also, the workpiece gear 12 may such as a rack or an oval gear. Also, the workpiece gear 12 may be a gear having a shape other than the cylindrical shape, such as a rack, an oval gear or an internal gear. Further, the brake member 35 may be eliminated, the mounting shaft 14 may be arranged to be rotated, and the drive shaft 11 and the mounting shaft 14 may be placed under synchronous control by a synchronizer 22, so that the desired braking force or rotation can be applied to the gears 12 and 13, without providing the brake members 35. Also, instead of brake member 35 or synchroizer 22, servo motors 50 with computer numerical control device may be used to adjust the rotation of the gears. The operation of either the brake member 35 or the synchronizer 22 or servo motors 50 maybe considered to be a rotation control means.

The master or standard gear 13 is prepared by cutting a gear member from a plate of a sintered hard alloy by means of electrospark machining of wirecut and then accurately finishing the teeth of the gear member, or by electrodepositioning diamond or CBN (cubic boron nitride) onto a basic gear member of a special tool steel material, or by further coating TiC or TiN on the gear member of the tool steel having the electrodeposited diamond or CBN.

In FIGS. 8 and 9, reference numerals 23 and 24 designate securing pins and a guide for the rocking levers 15, respectively.

The brake means 35 has a pair of brake members 36 and 37 each pivoted at a pivot pin 38. Each brake member 36 or 37 is provided with a circular notch 41 or 42 at its inner side surface 3 at substantially a middle point of the brake member 37. Substantially at the top of brake member 37 a through bore 43 is provided.

Through bore 43 has an internal thread at its inner surface. At the opposite side of brake member 37, a bolt 39 is provided with a spring 40 in brake member 36. Thus, the braking force upon the mounting shaft 14 is adjusted by the bolt 39.

Instead of brake means 35, any type of conventional brake device 21 can be used either to mounting shaft 14 or 11.

The gear tooth surface finishing method of the present invention will now be described in more details. The standard or master gear 13 is brought into meshing engagement with the workpiece gear 12 and, with or without supplying a working liquid between these two gears 12 and 13, the drive shaft 11 is rotated to rotate the workpiece gear 12 at a rotation speed of, for example, 100 revolutions per minute.

The master gear 13 meshing with the workpiece gear 12 is rotated while the rotation control means 21 or 22 is are applying braking force to the master gear 13. In the meantime, the rotary pin 17 turns in the slots 16, being driven from the drive motor 19, thereby causing the rocking movement of the rocking levers 15 in the direction of the arrow 20 about the pivot shaft 8. With the rocking movement of the rocking levers 15, the master gear 13 rocks at 1,000 to 3,000 times per minute toward and away from the workpiece gear 12. Thus, from the beginning to the end of the meshing engagement between the master gear 13 and the workpiece gear 12, the master gear 13 makes continuous rubbing contact in a direction as shown by the arrow I' with the mating tooth surfaces 30 of the workpiece gear 12 to burnish or scrape off any convex portions of the tooth surfaces 30 of the workpiece gear 12. Further, the rocking movement of the master gear 13 in the direction of the arrow I' would not give rise to local wear or cracking of the tooth surfaces 30 of the workpiece gear 12. After the completion of finishing the workpiece gear 12 in the manner described above, the workpiece gear 12 is removed from the shaft 11 and, after being turned over, is mounted on the shaft 11 again. The same finishing process as described above is then carried out to finish the other surface $30_R$ of the teeth of the workpiece gear 12. In lieu of turning over workpiece gear 12, the workpiece gear 12 may be rotated in the opposite direction.

In such a case, the pivot shaft 8 should be on another tangential line T', such as 8'''.

By the finishing process described above, the tooth surfaces 30 or $30_R$ of the workpiece gear 12 can be entirely, uniformly finished by the associated teeth of the master gear 13 in the tooth-depth direction, or radial direction of the workpiece gear 12. No surface unevenness occurs in the face-width direction and the axial direction of the workpiece gear 12 and the tooth surface 30 is entirely, smoothly finished. Further, because a certain degree of frictional resistance is imparted to the master gear 13 by the braking member 35 or 21 or by the synchronizer 22, all the meshed surfaces of the master gear 13 and workpiece gear 12 make smooth rubbing contact with each other without any backlash between their teeth so that the tooth surfaces 30 of the workpiece gear 12 can be uniformly and smoothly finished.

FIGS. 10-15 show a second embodiment of the applicant's invention.

The apparatus includes a bed 208, a column 209, a supporting member 210, a reciprocally moving member 211, and an eccentric cam 212 for reciprocally driving the member 211.

The reciprocally moving member 211 is supported in a floating manner with respect to top end receiver 230 of the member 210 and a member 215 by an air bearing shown in FIGS. 12-15. An air bearing is used because it can greatly reduce friction and because it prevents the dusts from entering into the sliding parts.

The use of the air bearing therefore enables finishing with a high degree of accuracy over a long period of time. Although the compressed air source for the air bearing is not shown, it has a usual structure as an air bearing means, so its detailed description is omitted here.

Figure 12:
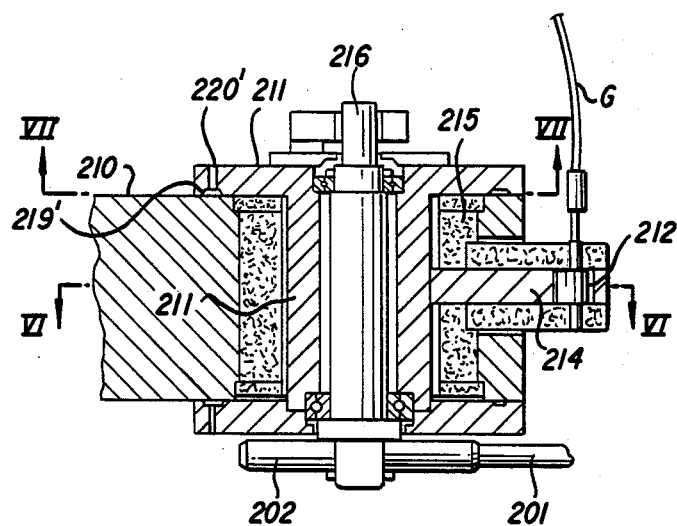
FIG. 12 is a cross-sectional view taken along the line V—V of FIG. 11.
Figure 13:
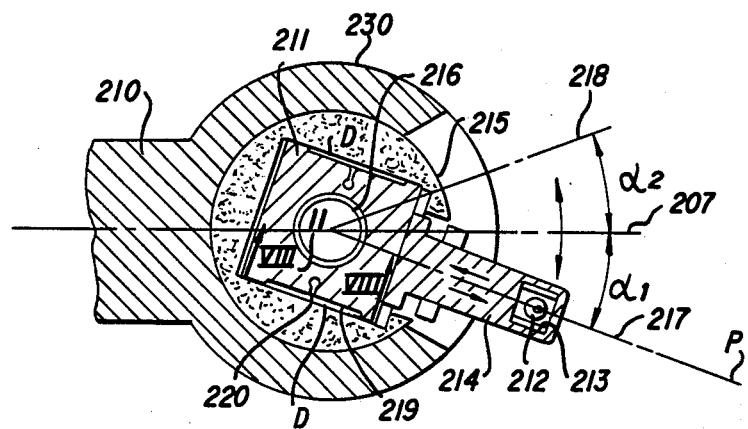
FIG. 13 is a cross-section view taken along the line VI—VI of FIG. 12.
Figure 14:
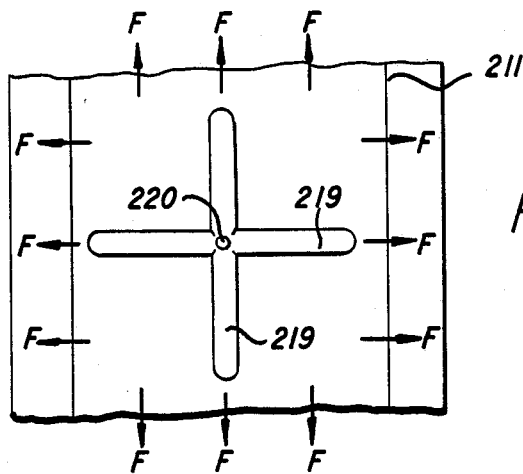
FIG. 14 is a sectional view taken along the line VIII—VIII of FIG. 12.
Figure 15:
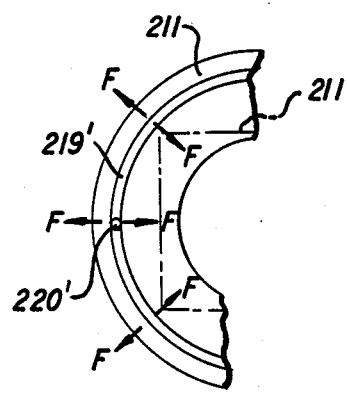
FIG. 15 is a sectional view taken along the line VII—VII of FIG. 12.

In the air bearing, air compressed to about 5 atmospheres is supplied from the compressed air source through inlet holes 220 and 220', as shown in FIGS. 12 and 13. The supplied air is fed along compressed air guiding grooves 219 and 219' in the directions indicated by the arrows F and the air spreads over the bearing surface D to form an air film.

A lubricant oil may be mixed with the compressed air to make it lubricating and anticorrosive.

The master gear 202 is reciprocally moved by the eccentric cam 212 which is pivoted within a cam groove 213 provided in a suitable position of an arm 214 fixed to the member 211, as shown in FIG. 13. The cam is rotated by a motor $M_1$ through a flexible shaft G shown in FIG. 10 and 12.

The member 211 is supported within the rotatable pivoting member 215 with the air bearing therebetween in a manner such that a mounting shaft 216 of the master gear 202 can be set at any desired angular position for instance, in the direction of the meshing pressure angle $\alpha_1$, in this embodiment, as shown in FIG. 13.

A brake 221 or a synchronizer 222 is provided to generate suitable tightening force to either gear.

The above apparatus is operated in the manner described below.

Figure 10:
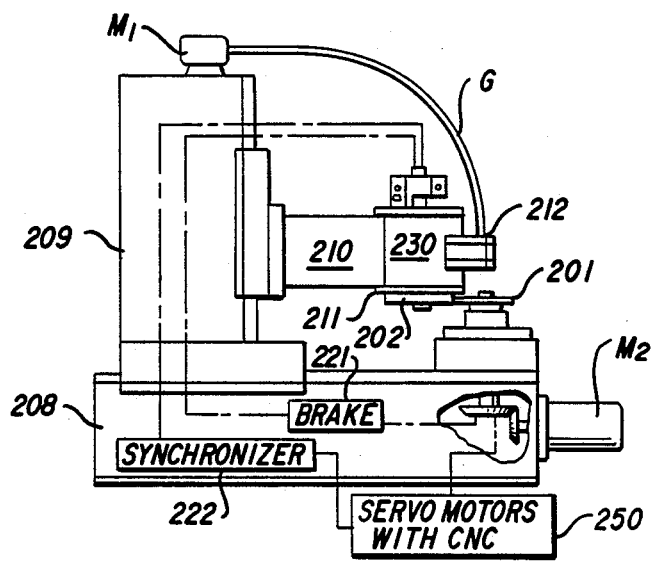
FIG. 10 illustrates another embodiment of the present invention.
Figure 11:
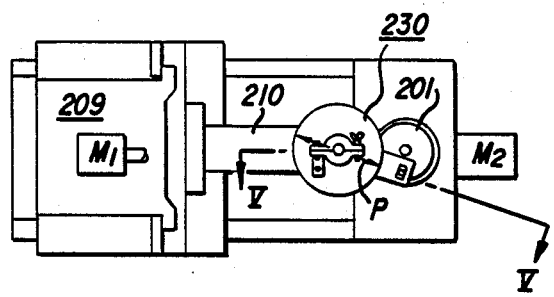
FIG. 11 is a plan view of the embodiment of FIG. 10.

As shown in FIGS. 10 and 12, the master gear 202 and the workpiece gear 201 are set in a manner such that the angle between the axis of the support member 210 and the member 214 forms a pressure angle $\alpha_1$ with respect to the axis of the support member 210. The workpiece gear 201 is rotated by a motor $M_2$ while the rotation of the master gear 202 is restricted by a brake 221 or a synchronizer 222 or servo motors 250 controlled by a computer numerical control device.

At the same time, the cam 212 is rotated by the motor $M_1$ through the flexible shaft G. Thus, the master gear 202 is rocked along the pressure line P.

In this way, one side of a tooth surface of the gear 201 is finished by the master gear 202 which rotates and at the same time reciprocally moves in the direction indicated by the pressure line P.

In this case, machine oil may be used, but no grinding compound is needed.

Next, in order to finish the other side of the tooth surface of the workpiece gear 201, the member 211 is positioned at a meshing pressure angle $\alpha_2$ with respect to the line 207.

Thereafter, the workpiece gear 201 is rotated in a direction opposite to the previous direction.

When the gear 201 is moved in the above second direction if the gear 201 is also turned over, it is not necessary to change the direction of reciprocal movement of the master gear 2.

In the above-described embodiment, the line 217, or the direction of the reciprocative movement, is shifted from the line 207 through the meshing pressure angle $\alpha_1$, however, the angle may be set to a value slightly different from the pressure angle.

Figure 1:
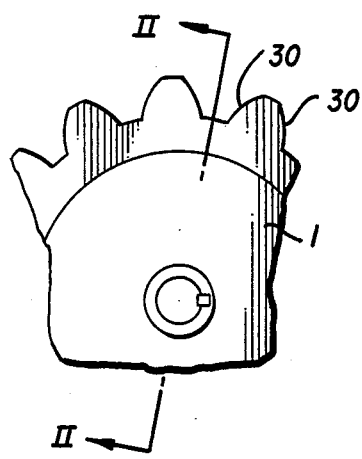
FIG. 1 is a fragmentary side view of a gear produced by prior art method.
Figure 2:
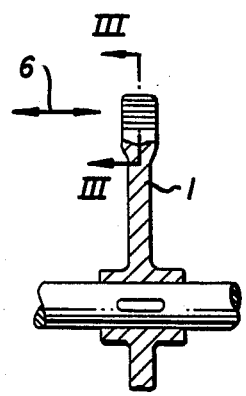
FIG. 2 is a cross-sectional view taken along the line II—II in FIG. 1.
Figure 3:
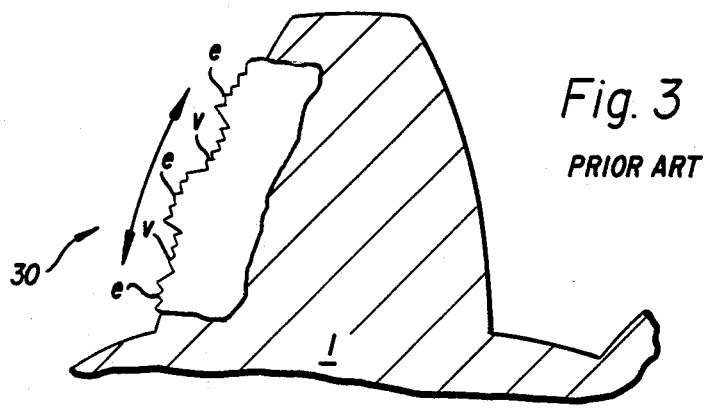
FIG. 3 is a cross-sectional view taken along the line III—III in FIG. 2.
Figure 4:
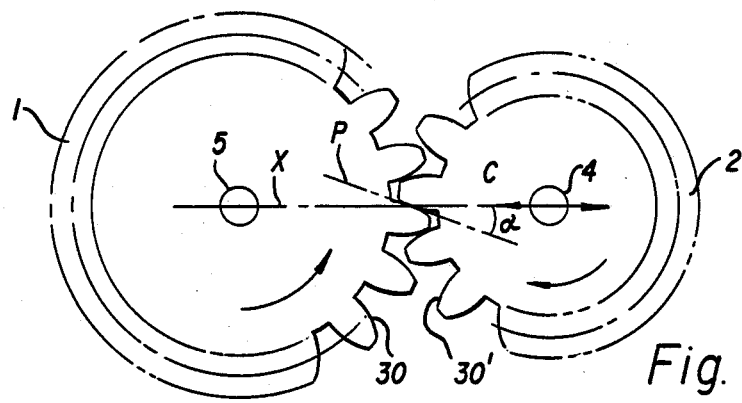
FIG. 4 is a plan view showing meshing engagement between the gears in a prior art method.

As will be undestood from the foregoing description, the master gear is relatively and reciprocally moved toward and away from the workpiece gear. In consequence, no irregularities (recessed portions v and protruded portions e in FIG. 3) remain on the tooth surface 30 of the workpiece gear, thus increasing the accuracy with which the gear is finished to class 1 to 3 of Deutsche Industrienorm, which has been conventionally impossible to achieve, and further reducing the level of noise to a great extent.

A pitch test was conducted on a gear finished according to the method of the present invention shown in FIGS. 8 and 9 and also on a gear finished by grinding only. In this pitch test, the reading on the scale of a measuring instrument applied to a point of a first tooth of each of the gears is taken as zero, and, while successively rotating the gear from the position of the first tooth, the reading at the same point of each of the succeeding teeth is observed up to the 23rd tooth. Then, on the basis of the data obtained, an adjacent pitch error, a single pitch error and a accumulative pitch error are calculated for each of the gears. Table 1 shows the data of the gear finished by grinding only. Table 2 shows the data of the gear finished according to the method of the present invention.

In this experiment, the various data are as follows.

Length from mounting shaft 14 to the pivot pin 8: 80 mm

Length from mounting shaft 14 to the slot 16: 120 mm

Workpiece gear:
pitch circle diameter = 51.75 mm,
number of teeth = 23
Module = 2.25

Master gear:
pitch circle diameter = 92.25 mm
number of teeth = 41
Module = 2.25
Rock speed: about 1200 strokes/min.
Width of stroke: 0.2 mm

TABLE 1

| TOOTH NO. | READING | ADJAC. | SINGLE | ACCUM. |
|---|---|---|---|---|
| | (grinding only) | | | |
| 1 | 0.0 | 1.2 | −0.1 | −0.1 |
| 2 | −1.2 | 0.4 | −1.3 | −1.4 |
| 3 | −0.3 | 0.1 | −0.9 | −2.3 |
| 4 | −0.9 | 0.6 | −1.0 | −3.3 |
| 5 | −0.3 | 0.6 | −0.4 | −3.7 |
| 6 | 0.3 | 0.5 | 0.2 | −3.5 |
| 7 | −0.2 | 0.2 | −0.3 | −3.8 |
| 8 | 0.0 | 0.4 | −0.1 | −3.9 |
| 9 | −0.4 | 3.0 | −0.5 | −4.4 |
| 10 | 2.5 | 1.3 | 2.5 | −1.9 |
| 11 | 1.3 | 0.7 | 1.2 | −0.7 |
| 12 | 0.6 | 1.5 | 0.5 | −0.3 |
| 13 | 2.1 | 1.9 | 2.0 | 1.6 |
| 14 | 0.2 | 2.1 | 0.1 | 1.7 |
| 15 | 2.3 | 0.4 | 2.2 | 3.9 |
| 16 | 2.7 | 1.8 | 2.6 | 6.5 |
| 17 | 0.9 | 1.2 | 0.8 | 7.3 |
| 18 | −0.3 | 0.6 | −0.4 | 6.9 |
| 19 | −0.9 | 0.4 | −1.0 | 5.9 |
| 20 | −0.5 | 1.8 | −0.6 | 5.3 |
| 21 | −2.3 | 2.3 | −2.4 | 2.9 |
| 22 | 0.0 | 2.7 | −0.1 | 2.8 |
| 23 | −2.7 | 2.7 | −2.8 | 0.0 |
| MAX. | | 3.0 | 2.8 | 11.7 |

TABLE 2

| | (present invention) | | | |
|---|---|---|---|---|
| TOOTH NO. | READING | ADJAC. | SINGLE | ACCUM. |
| 1 | 0.0 | 1.0 | 0.8 | 0.7 |
| 2 | −1.0 | 0.2 | −0.2 | 0.5 |
| 3 | −0.8 | 0.3 | 0.0 | 0.4 |
| 4 | −1.1 | 1.0 | −0.3 | 0.1 |
| 5 | −2.1 | 2.1 | −1.3 | −1.2 |
| 6 | 0.0 | 1.4 | 0.8 | −0.4 |
| 7 | −1.4 | 0.1 | −0.6 | −1.1 |
| 8 | −1.5 | 0.4 | −0.7 | −1.8 |
| 9 | −1.1 | 0.2 | −0.3 | −2.8 |
| 10 | −1.3 | 0.9 | −0.5 | −2.7 |
| 11 | −0.4 | 0.8 | 0.4 | −2.4 |
| 12 | −0.7 | 0.5 | 0.1 | −2.8 |
| 13 | −1.2 | 0.4 | −0.4 | −2.8 |
| 14 | −0.8 | 0.5 | 0.0 | −2.8 |
| 15 | −0.3 | 1.0 | 0.5 | −2.4 |
| 16 | 0.7 | 1.4 | 1.5 | −0.9 |
| 17 | −0.7 | 1.2 | 0.1 | −0.9 |
| 18 | 0.5 | 1.8 | 1.3 | 0.8 |
| 19 | −1.3 | 0.2 | −0.5 | −0.8 |
| 20 | −1.1 | 0.5 | −0.3 | −0.5 |
| 21 | −0.6 | 1.0 | 0.2 | −1.4 |
| 22 | −1.6 | 2.1 | −0.8 | −1.2 |
| 23 | 0.5 | 0.5 | 1.3 | 0.0 |
| | MAX. | 2.1 | 1.5 | 3.5 |

It will be seen in Tables 1 and 2 that the values of the adjacent pitch error, single pitch error and accumulative pitch error detected after the process of finishing decrease greatly from those detected before the process of finishing, as shown in Table 3.

TABLE 3

| | Before Finishing (Table A) | After Finishing (Tabe 2) |
|---|---|---|
| Adjacent pitch error | Max 3.0 μm | Max 2.1 μm |
| Single pitch error | Max 2.8 μm | Max 1.5 μm |
| Accumulative pitch error | Max 11.7 μm | Max 3.5 μm |

Further, a tooth profile error (an error in the tooth-depth direction) and a tooth trace error (an error in the tooth-trace direction) of a gear were measured at four points respectively before and after the gear was finished according to the method of the present invention. According to the results of measurement, the tooth profile error decreased from a maximum of 12 μm to a maximum of 11 μm, and the tooth trace error decreased from a maximum of 10 μm to a maximum of 5 μm. Further, when the surface roughness of the above gear was measured at five tooth surfaces before and after the gear was finished by the method of the present invention, the surface roughness decreased from a maximum of 2.5 μm to a maximum of 1.5 μm. Further, when meshing noise was measured in an anechoic room before and after the gear was finished by the method of the present invention, the sound pressure at 8,000 Hz decreased from 42 db to 35 db.

It will be understood from the foregoing description of an embodiment of the method of the present invention that a master gear of very hard material disposed in meshing engagement with a workpiece gear is rocked toward and away from the workpiece gear to finish the tooth surfaces of the workpiece gear by rubbing contact with those surfaces. Therefore, the tooth surfaces of the workpiece gear can be uniformly and smoothly finished, and surface unevenness along the tooth depth can be minimized. Also, the tooth profile of the workpiece gear can be corrected simultaneously with the finishing of the tooth surfaces. Thus, the gear finished by the method of the present invention has a tooth profile very close to an ideal one and has minimized unevenness of the tooth surfaces. Therefore, when the gear is incorporated in a machining tool or an automobile, it meshes smoothly with a mating gear with greatly decreased meshing noise, that is without generating offensive meshing noise under rotation. Further, means of merely very simple structure are required for putting the method of the present invention into practice, and such means can be easily handled by anyone without giving rise to trouble during the process of gear finishing. Thus, experience and skill of the operator are not required at all for finishing gears, and gears can now be finished by simple manipulation.

In the embodiment described above, mechanical rocking drive means such as a cam an oil hydraulic cylinder or a pneumatic cylinder may be used for causing the rocking movement of the master gear relative to the workpiece gear. Further, ultrasonic or electrical rocking drive means may also be used to cause the rocking movement of the master gear relative to the workpiece gear.

It is noted that, according to the various experiments, the rocking movement does not necessarily have to be restricted on or above the involute line of the tooth surface of the workpiece gear. This is because since as long as the rocking movement follows substantially along the involute line or the pressure line, any cutting below the involute line is so small, that such amount of cutting will not cause a serious effect upon the finished gear surface.

Thus the rocking movement is sufficient as long as it does not substantially interfere beyond the involute line of the tooth surface of the workpiece gear.

What is claimed:

1. A method of finishing an involute gear tooth surface of a workpiece gear, comprising the steps of:
   engaging said workpiece gear with a master gear having involute gear tooth surfaces in a meshing fashion for cooperatively rotating said workpiece gear with said master gear so that contacting involute gear tooth surfaces of said workpiece and master gears contact through at least one contact point, said contact point shifting along said contacting involute gear tooth surfaces as said workpiece and master gears rotate; and
   simultaneously causing at least one of said gears to rock with respect to the other along a tooth profile direction extending between a tooth root and a tooth top of a contacting gear tooth of said workpiece gear in a manner such that the relative rocking motion between said contacting involute gear surfaces at any position of said shifting contact point is along said tooth profile direction and is always substantially tangent with respect to said involute gear tooth surface of said workpiece at said shifting contact point and said shifting contact point does not interfere, at any position thereof, substantially beyond an involute curve, and into the body, of said contacting involute gear tooth surface of said workpiece gear.

2. The method of claim 1, wherein said master gear is made of tool steel or similar hard material.

3. The method of claim 1, wherein a complete stroke of said rocking motion is substantially along a pressure line between said workpiece and master gears.

4. The method of claim 1, wherein said rocking motion is substantially 1,000 times per minute or more.

5. The method of claim 1, wherein the stroke length of said rocking motion is substantially 0.2 mm.

6. The method of any of claims 1 to 4 and 5, wherein the rotation of said workpiece and master gears are synchronously controlled.

7. An apparatus for finishing an involute gear tooth surface of a workpiece gear, comprising:
- a rotatable workpiece gear having involute gear tooth surfaces;
- a first supporting means for supporting said workpiece gear;
- a rotatable master gear having involute gear tooth surfaces and engaging with said rotatable workpiece gear in a meshing fashion through at least one contact point between contacting involute gear tooth surfaces of said workpiece and master gears, said contact point shifting along said contacting involute gear tooth surfaces as said workpiece and master gear rotate;
- a second support means for supporting said master gear;
- a driving means for rotating at least one of said workpiece and master gears;
- a rotation control means for controlling the rotation of at least one of said workpiece and master gears; and
- a rocking motion generating means for relatively rocking said workpiece and master gears substantially along a tooth profile direction extending between a tooth root and a tooth top of a contacting gear tooth of said workpiece gear in a manner such that said relative rocking motion between said contacting involute gear tooth surfaces at any position of said shifting contact point is along said tooth profile direction and is always substantially tangent with respect to said contacting involute tooth surface of said workpiece at said shifting contact point and said shifting contact point does not interfere, at any position thereof, substantially beyond an involute curve, and into the body, of said contacting involute gear tooth surface of said workpiece gear.

8. The apparatus for finishing a gear tooth surface according to claim 7, wherein at least one of said first and second supporting means is a lever having a pivot at one end thereof positioned substantially on a tangential line passing tangent to the base circles of said workpiece and master gears.

9. The apparatus for finishing a gear tooth surface according to claim 8, wherein said pivot is positioned substantially at an interference point of said workpiece gear.

10. The apparatus for finishing a gear tooth surface according to claim 8, wherein said pivot is positioned substantially at an interference point of said master gear.

11. The apparatus for finishing a gear tooth surface according to claim 8, wherein said rotation control means is a brake.

12. The apparatus for finishing a gear tooth surface according to claim 11, wherein said brake has a pair of bake members each pivoted at one end thereof on said rock lever means and having a closing means at the other end thereof for adjusting the open degree of said brake members.

13. The apparatus for finishing a gear tooth surface according to claim 8, wherein said lever has a length adjust means.

14. The apparatus for finishing a gear tooth surface according to claim 7, wherein at least one of said first and second supporting means further has an angular position adjustable means for adjusting the engagement angle between said workpiece and master gears.

15. The apparatus for finishing a gear tooth surface according to claim 14, wherein said angular position adjustable means includes a receiver having a circular cross-sectional chamber therein, a rotatable cylinder positioned within said circular cross-sectional chamber and having a rectangular cross-sectional chamber therein and a slidable member positioned within said rectangular cross-sectional chamber, wherein said slidable member is connected to said rocking motion generating means.

16. The apparatus for finishing a gear tooth surface according to claim 15, wherein an air bearing is provided between said rectangular cross-sectional chamber and said slidable member.

17. The apparatus for finishing a gear tooth surface according claim 14, wherein said rotation control means is a brake.

18. The apparatus for finishing a gear tooth surface according to claim 7 or 14, wherein said rotation control means is a synchronizer.

19. The apparatus for finishing a gear tooth surface according to claim 7 or 14, wherein said rotation control means is a servo motor controlled by a computer numerical control device.

20. The apparatus of claim 7, wherein said master gear is made of tool steel or a similar hard material.

21. The apparatus of claim 7, wherein said rocking motion is substantially 1,000 times per minute or more.

22. The apparatus of claim 7, wherein the stroke length thereof is substantially 0.2 mm.

23. The apparatus of claim 7, wherein a complete stroke of said rocking motion is substantially along a pressure line between said workpiece and master gears.

* * * * *

UNITED STATES PATENT AND TRADEMARK OFFICE
CERTIFICATE OF CORRECTION

PATENT NO. : 4,920,703

DATED : May 1, 1990

INVENTOR(S) : Norio HOSOYA

It is certified that error appears in the above-identified patent and that said Letters Patent is hereby corrected as shown below:

On the cover page, Item [30], after "63-17963" add the following:
--Jul. 20, 1988 [JP] Japan .................. 63-179226
June 4, 1986 [JP] Japan .................. 61-128054--.

Signed and Sealed this

Eighth Day of October, 1991

Attest:

HARRY F. MANBECK, JR.

*Attesting Officer*    Commissioner of Patents and Trademarks